United States Patent
Byrne et al.

(10) Patent No.: US 10,769,636 B2
(45) Date of Patent: Sep. 8, 2020

(54) COGNITIVE FRAUD DETECTION THROUGH VARIANCE-BASED NETWORK ANALYSIS

(71) Applicant: International Business Machines Corporation, Armonk, NY (US)

(72) Inventors: Brian P. Byrne, Austin, TX (US); Sushain Pandit, Austin, TX (US); Vijay Ekambaram, Chennai (IN); Adam R. Holley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/204,028

(22) Filed: Nov. 29, 2018

(65) Prior Publication Data

US 2020/0175517 A1 Jun. 4, 2020

(51) Int. Cl.
| | |
|---|---|
| *G06Q 20/40* | (2012.01) |
| *G06N 5/04* | (2006.01) |
| *H04L 12/24* | (2006.01) |
| *H04L 12/26* | (2006.01) |

(52) U.S. Cl.
CPC ......... *G06Q 20/4016* (2013.01); *G06N 5/048* (2013.01); *H04L 41/06* (2013.01); *H04L 41/12* (2013.01); *H04L 41/142* (2013.01); *H04L 41/145* (2013.01); *H04L 43/045* (2013.01); *H04L 43/067* (2013.01); *H04L 43/16* (2013.01)

(58) Field of Classification Search
CPC ... G06Q 20/4016; H04L 41/12; H04L 41/145; H04L 43/045; H04L 41/142
See application file for complete search history.

(56) References Cited

U.S. PATENT DOCUMENTS

| | | |
|---|---|---|
| 6,330,546 B1 | 12/2001 | Gopinathan et al. |
| 7,562,814 B1 | 7/2009 | Shao et al. |
| 7,686,214 B1 | 3/2010 | Shao et al. |
| 7,752,084 B2 | 7/2010 | Pettitt |
| 8,280,833 B2 | 10/2012 | Miltonberger |

(Continued)

OTHER PUBLICATIONS

Carey E. Priebe, John M. Conroy, David J. Marchette, and Youngser Park: "Scan statistics on enron graphs," Computational and Mathematical Organization Theory, 11(3):229-247, Oct. 2005. ISSN 1381-298X.

(Continued)

*Primary Examiner* — Robert R Niquette
*Assistant Examiner* — Pierre L Maccagno
(74) *Attorney, Agent, or Firm* — Mollborn Patents, Inc.; Fredrik Mollborn

(57) ABSTRACT

Methods and apparatus, including computer program products, implementing and using techniques for identifying pathways in a graph of interconnected nodes. A time series of graph data is captured, which corresponds to events occurring at different nodes in the graph. The graph is traversed to identify consistent and variable pathways, respectively, within the graph. The identified pathways are scored according to a particular feature to establish an expected variance model for the events contained within the graph. Newly received data are compared against the expected variance model to determine a degree to which the newly received data deviates from the expected variance. The variance model is adjusted based on the newly encountered data.

13 Claims, 2 Drawing Sheets

(56) References Cited

U.S. PATENT DOCUMENTS

| | | | |
|---|---|---|---|
| 8,359,278 B2* | 1/2013 | Domenikos | G06Q 40/08 705/1.1 |
| 8,386,377 B1 | 2/2013 | Xiong et al. | |
| 8,429,070 B2 | 4/2013 | Hu et al. | |
| 8,533,825 B1 | 9/2013 | Marsa et al. | |
| 9,734,501 B2* | 8/2017 | Durney | G06Q 20/4016 |
| 2002/0194119 A1 | 12/2002 | Wright et al. | |
| 2008/0086409 A1 | 4/2008 | Moorman et al. | |
| 2015/0046332 A1 | 2/2015 | Adjaoute | |
| 2016/0241554 A1* | 8/2016 | Zizi | G06K 9/00885 |
| 2017/0017781 A1* | 1/2017 | Turgeman | H04L 63/08 |
| 2018/0033089 A1* | 2/2018 | Goldman | G06Q 40/10 |
| 2019/0311367 A1* | 10/2019 | Reddy | G06Q 20/4016 |

OTHER PUBLICATIONS

Misael Mongiovi, Petko Bogdanov, Razvan Ranca, Ambuj K. Singh, Evangelos E. Papalexakis, and Christos Faloutsos. Netspot: "Spotting significant anomalous regions on dynamic networks," In Proceedings of the 13th SIAM International Conference on Data Mining (SDM), Texas-Austin, TX, 2013. pp. 28-36.

"Fraud Prevention: Learn how leading organizations and institutions prevent fraud in the digital age." IQ: Journal of Advanced Analytics. Michael Hagstrom, Editorial Director. 3Q, 2012. SAS Institute Inc. Copyright © 2012 SAS Institute Inc., Cary, NC, USA. 28 pp.

Ferdousi, Zakia et al.; "Unsupervised Outlier Detection in Time Series Data"; Proceedings of the 22nd International Conference on Data Engineering Workshops (ICDEW'06) © 2006 IEEE. 6 pp.

Morchen, Fabian. "Time Series Knowledge Mining"; Dissertation; Marburg/Lahn 2006; 178 pp.

Shekhar, Shashi et al.; "Detecting Graph-Based Spatial Outliers: Algorithms and Applications(A Summary of Results)"; Copyright ACM 2001; pp. 371-376.

Sokol, Lisa et al.; "Using Entity Analytics to Greatly Increase the Accuracy of Your Models Quickly and Easily"; Redguides for business Leaders; © 2012 IBM Corp.; 12 pp.

* cited by examiner

COGNITIVE FRAUD DETECTION THROUGH VARIANCE-BASED NETWORK ANALYSIS

BACKGROUND

The present invention relates to network analysis, and more specifically, to identifying pathways in a graph of interconnected nodes.

Today's fraud detection and financial crime systems are slowly progressing from analysis of traditional relational data sets to Cognitive analysis of complex networks of data, in part because of the advent of more complex fraud patterns and in part because of a desire to detect increasingly more obscured patterns of fraud than ever before. In particular, financial crimes related to money laundering, tax fraud and cross domain fraud are inherently committed through extremely complex networks of interrelated parties, transaction and resources.

Unfortunately, analysis of these networks by traditional means is very complex, and is typically limited by non-cognitive approaches with a need to know what fraud patterns are to be detected, and a tuning of network analytics to identify those patterns. However, in many cases it is not possible to know beforehand what you are looking for, and it would therefore be good to capture "emergent patterns" in highly complex networks of related entities. A variety of techniques have existed for some time to assist with detection of emergent patterns and outlier conditions in traditional data sets. However, there are far fewer patterns that work well when the data set is a complex network of entities.

SUMMARY

According to one embodiment of the present invention, methods, systems and computer program products are provided for identifying pathways in a graph of interconnected nodes. A time series of graph data is captured, which corresponds to events occurring at different nodes in the graph. The graph is traversed to identify consistent and variable pathways, respectively, within the graph. The identified pathways are scored according to a particular feature to establish an expected variance model for the events contained within the graph. Newly received data are compared against the expected variance model to determine a degree to which the newly received data deviates from the expected variance. The variance model is adjusted based on the newly encountered data.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
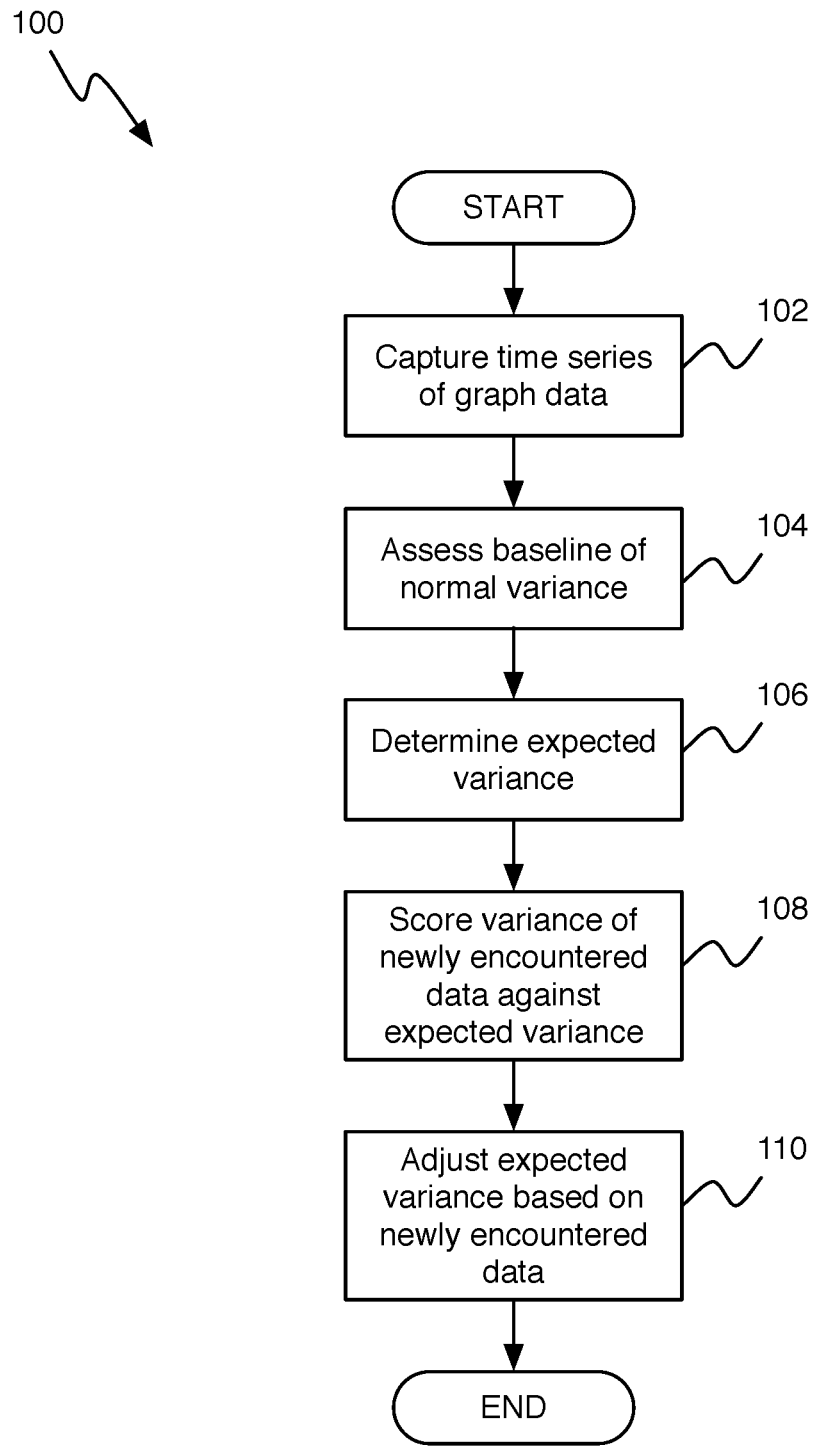
FIG. 1 shows a process 100 for fraud detection, in accordance with one embodiment.

The various embodiments of the invention pertain to techniques for using a cognitive means to infer patterns and potential fraud indicators by monitoring instance level variance in network models, and while at the same time masking off noise created by "uninteresting" variance in those network models.

For simplicity, consider the following example of a network of nodes that represents a particular party (John) and a fragment of their purchasing patterns, e.g., where and when they purchase gas, and how much gas they purchase. For the purposes of this example, assume that John is a predictable person who drives the same vehicle to and from the same office at the same time every day. As a result, he tends to run out of gas about the same time (e.g., Friday afternoon) and is in the habit of stopping by the same gas station on his way home every Friday to buy an even $40 of gas.

Now consider a different network of nodes that represent Albert, who in contrast to John, is a much less predictable creature. He owns a car, a truck and a bike, and which one he takes to work is a matter of whim. Further, he only works in the office a few days a week, and what days is also random—depending entirely on his calendar of meetings and other commitments. As such, Albert runs out of gas at random times, fills up at random locations, and buys random amounts of gas, depending on what vehicle he is driving at the time.

If a typical analysis is performed of these networks, perhaps for the purposes of detecting card fraud at a Point of Sale (POS), i.e., the pump, the instances that follow a John-like pattern and the instances that follow an Albert-like pattern are intermingled. This makes it difficult to know when a pattern is a pattern, and thus when variance from that pattern is an indicator (John-like) of something irregular going on, versus when variance is the norm, and is far less of an indicator (Albert-like).

In accordance with the various embodiments of the invention described herein, pathways (not individual links) within a network can be profiled in order to score those chains according to variance—at an instance level. Pathways that have a high degree of consistency across instances of data (e.g., repeated visits by the same person to the same gas station at the same time of day, same day of week, and purchasing the same $40 of gas) develop an increased (although not necessarily linearly) score with each recurrence of the pattern. By contrast, patterns that do not recur remain at a low score.

In addition, as new instances of pathways occur (e.g. new purchases of gas), these may be scored against the existing network, and assessed for degree of variance, before being used themselves to adjust the pathway scores in the network. Referring to the example above, if John's credit card was used at 3 a.m. on a Monday morning at a gas station across town, to buy $120 of gas, that occurrence would be highly variant from the existing pathways seen so far, and would thus score as highly indicative. Such an indicator may trigger an alert in a fraud detection system for a human investigator to follow up on. In contrast, if a similar transaction shows up for Albert, that would be far less variant from an existing recognized pattern, and thus would be scored lower and be less likely to trigger an alert (although other rules may of course get triggered).

The various embodiments described herein addresses issues such as these by providing techniques, within a highly complex network of interconnected nodes to, based on emergent patterns, to identify the most indicative pathways within that model, not at a type level, but at an instance level. As used herein, "type level" implies concepts and their interrelationships at a level of abstraction that is not specific to the patterns of use for a particular user (i.e., the "instance level"). For example, if a certain "type" or "class" of individuals use their credit card for filling gas on their way back from work three times a month, this would be a pattern at the "type level." In contrast, if a particular individual (e.g., John or Albert) uses his credit card in certain manner that establishes very unique/personalized pattern or pathways, this would be a pattern at the "instance level," which is the primary focus on the present invention. This provides a self-tuning mechanism that automatically provides an assessment of the most outlying patterns for individual nodes in the network.

With reference now to FIG. 1, a process 100 for fraud detection, in accordance with one embodiment, will now be explained. As can be seen in FIG. 1, the process 100 starts by capturing a time series of graph data, e.g., typical business data, corresponding to successive points in time; –g0, g1, g2, g3, . . . , gn, step 102. Typically, graph technology and underlying store is used to capture data passed from transactional or operational systems, or from a system such as a fraud detection solution. As such, data is passed into the graph and captured as a time series. Taking the example above, each time Albert or John purchase gas, the system captures the details of that transaction, such as the location and details of the gas station, the time of the transaction, the amount of gas purchased, and any other available data such as weather, related purchases, and so on. Over time, population of the graph in this way results in a time series history of behavior, in this case for Albert and John and their gas purchasing habits. It should be noticed that a graph-based time series is not only sensitive to time-based changes, but also to structural changes. That is, the techniques described herein make it possible to take into account whether there are any changes to graph-specific properties, such as missing nodes, new nodes, changes to the edge weight, etc.

Next, the time series is used to assess a baseline of normal variance for the business elements contained within the graph, step 104. In one embodiment, the baseline is represented as a set of pathways in the graph. Since a path is essentially a collection of nodes and edges, this can be stored as a series of nodes, such as {v0, v1, v5, v7, . . . }. In some embodiments, there may be annotations stored with each node and edge. In a database, this can be easily represented as a matrix of numbers. Once the baseline has been established, it is used to determine the expected variance of elements within the graph, step 106. Having this time series, the graph can be traversed and pathways can be scored according to their frequency. In one embodiment, a simple model is applied, in which a score is increased linearly according to the frequency with which a path recurs. However, given the presence of inexact elements (such as the exact timestamp of an occurrence, or the exact dollar amount of gas purchased), some embodiments instead use a fuzzy matching (e.g., a standard deviation-based approach), as it may be more effective at identifying recurrence. It should be noted that different matching techniques may be more appropriate for certain data element types than others, so in some embodiments the matching mechanism can be specified, for example, by a user, based on the characteristics of the data that is to be matched. Irrespective of the particular matching technique used, the result of this phase is a populated and scored (from the point of view of expected variance) graph—identifying highly variant pathways (Albert) and highly consistent pathways (John) scored accordingly.

As new data sets (for example, new gas purchases) arrive, their variance is assessed and scored against the expected variance scores to determine how much the new data sets' variance differs from the expected variance scores, step 108. In some embodiments, this can be done in real time. Many approaches are available for this computation, for example, reduction of problem to a graph equivalent such that one of the techniques in Carey E. Priebe, John M. Conroy, David J. Marchette, and Youngser Park: "Scan statistics on enron graphs," Computational and Mathematical Organization Theory, 11(3):229-247, October 2005. ISSN 1381-298X, or in Misael Mongiovi, Petko Bogdanov, Razvan Ranca, Ambuj K. Singh, Evangelos E. Papalexakis, and Christos Faloutsos. Netspot: "Spotting significant anomalous regions on dynamic networks," In Proceedings of the 13th SIAM International Conference on Data Mining (SDM), Texas-Austin, Tex., 2013. The result of this phase is the scoring of the difference in variance of the newly encountered data versus the expected variance model.

Knowing this difference makes it possible to draw a number of conclusions. For example, a highly variant gas purchase coupled with other similar data can be used to infer that a credit card has been compromised, and to produce a corresponding risk or fraud score. In practice this may be performed in conjunction with a system, such as the IBM Counter Fraud Management, which is provided by International Business Machines Corporation of Armonk, N.Y., to pass a variance score to an engine that performs wider analytics to infer such a fraud score as part of a scoring model. Such scoring models are available, for example, in products such as IBM SPSS or a rules model within IBM ODM, both of which are also available from International Business Machines (IBM) Corporation.

Over time as new data sets arrive, they can then be used to adjust the expected variance of the elements within the graph, step 110. For example, the system may revise weights or reconstruct the graph of normal behavior. Over time, what initially seemed to be very "John-like" behavior, may turn out to be slightly more "Albert-like." In one embodiment, confirmed fraud patterns are screened off from the graph, in order to avoid biasing the understanding of what "normal" behavior looks like with behavior that is known to be abnormal. Otherwise, the feeding of the graph can be done in a very similar manner to that described above with respect to step 106. This ends the process 100.

Figure 2:
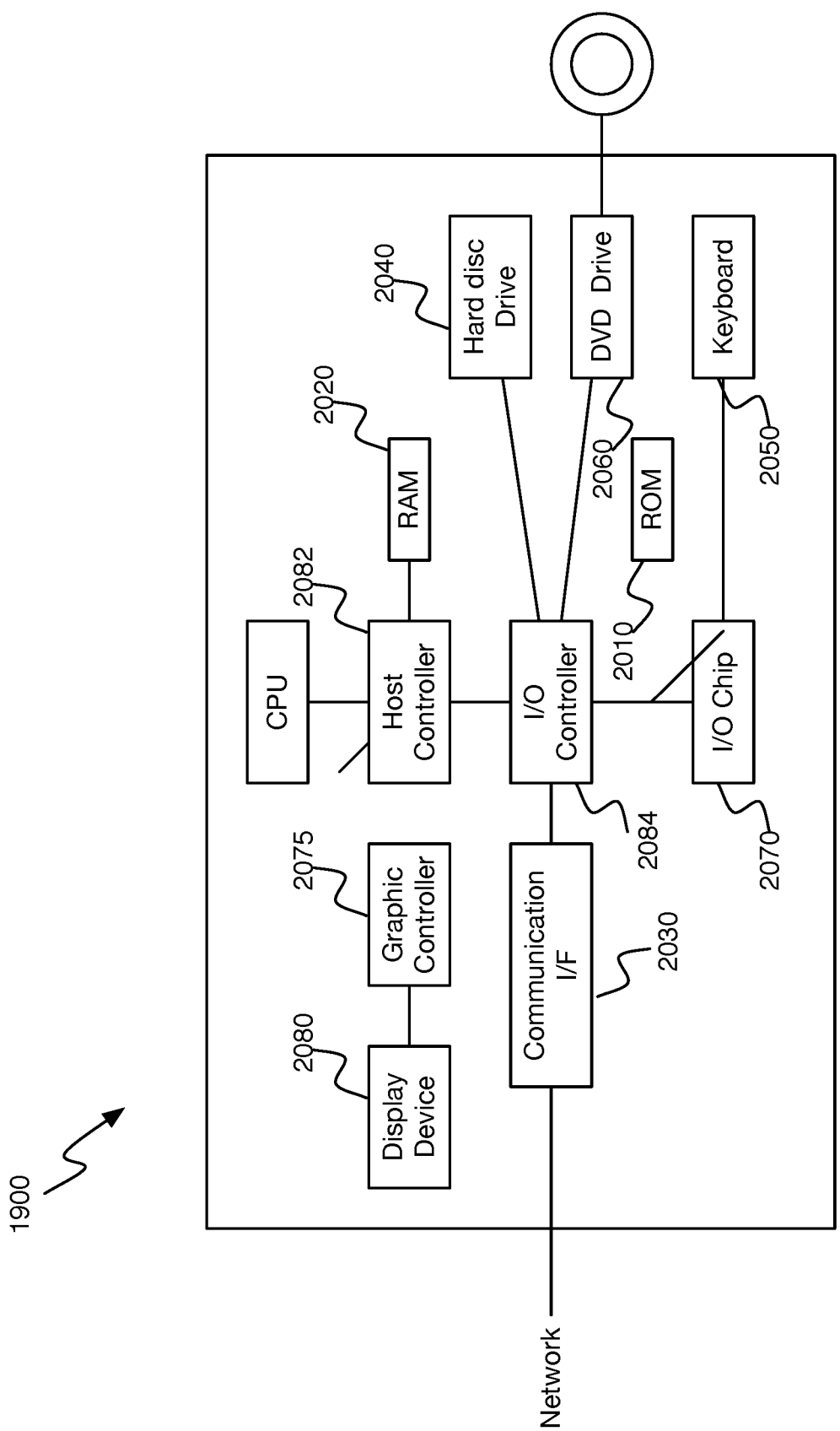
FIG. 2 shows an exemplary configuration of a computer in accordance with one embodiment.

FIG. 2 shows an exemplary configuration of a computer 1900 in accordance with one embodiment. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus implementing the process 100 of FIG. 1, includes a SIEM Risk Management module.

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example, when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020, such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method in a fraud detection system for detecting fraud based on identified pathways in a graph of interconnected nodes, comprising:
   providing a data store and a network of interconnected nodes, wherein the nodes are configured to capture data passed from transactional or operational systems;
   capturing a time series of graph data corresponding to events occurring at different nodes in the graph;
   traversing the graph to identify consistent and variable pathways, respectively, at an instance level within the graph;
   scoring the identified pathways according to a particular feature to establish an expected variance model for the events contained within the graph;
   comparing newly received data against the expected variance model to determine a degree to which the newly received data deviates from the expected variance;
   generating an alert in the fraud detection system in response to detecting that a deviation between the newly received data and the expected variance exceeds a predetermined threshold; and
   automatically adjusting the variance model based on the newly encountered data.

2. The method of claim 1, wherein the data represent financial transactions.

3. The method of claim 1, wherein the time series of graph data is indicative of both time-based changes and structural changes.

4. The method of claim 1, wherein scoring includes:
   increasing a score linearly according to a frequency with which a path recurs.

5. The method of claim 1, wherein scoring includes:
   using a fuzzy matching technique.

6. The method of claim 5, wherein different features are scored using different scoring techniques.

7. A fraud detection system for detecting fraud based on identified pathways in a graph of interconnected nodes, comprising:
   a processor; and
   a memory containing instructions that when executed by the processor causes the following method to be performed:
   providing a data store and a network of interconnected nodes, wherein the nodes are configured to capture data passed from transactional or operational systems;
   capturing a time series of graph data corresponding to events occurring at different nodes in the graph;
   traversing the graph to identify consistent and variable pathways, respectively, at an instance level within the graph;
   scoring the identified pathways according to a particular feature to establish an expected variance model for the events contained within the graph;
   comparing newly received data against the expected variance model to determine a degree to which the newly received data deviates from the expected variance;
   generating an alert in the fraud detection system in response to detecting that a deviation between the newly received data and the expected variance exceeds a predetermined threshold; and
   automatically adjusting the variance model based on the newly encountered data.

8. The system of claim 7, wherein the data represent financial transactions.

9. The system of claim 7, wherein the time series of graph data is indicative of both time-based changes and structural changes.

10. The system of claim 7, wherein scoring includes:
    increasing a score linearly according to a frequency with which a path recurs.

11. The system of claim 7, wherein scoring includes:
    using a fuzzy matching technique.

12. The system of claim 7, wherein different features are scored using different scoring techniques.

13. A computer program product for detecting fraud based on identified pathways in a graph of interconnected nodes, the computer program product comprising a computer readable storage medium having program instructions embodied therewith, wherein the computer readable storage medium is not a transitory signal per se, the program instructions being executable by a processor to cause the processor to perform a method comprising:
    providing a data store and a network of interconnected nodes, wherein the nodes are configured to capture data passed from transactional or operational systems;
    capturing a time series of graph data corresponding to events occurring at different nodes in the graph;
    traversing the graph to identify consistent and variable pathways, respectively, at an instance level within the graph;
    scoring the identified pathways according to a particular feature to establish an expected variance model for the events contained within the graph;
    comparing newly received data against the expected variance model to determine a degree to which the newly received data deviates from the expected variance;
    generating an alert in the fraud detection system in response to detecting that a deviation between the newly received data and the expected variance exceeds a predetermined threshold; and
    automatically adjusting the variance model based on the newly encountered data.

* * * * *